Dec. 8, 1953     R. B. VOGT ET AL     2,661,828
CONVEYER SYSTEM
Filed Feb. 13, 1948     4 Sheets-Sheet 1

INVENTORS
Rudolph B. Vogt
BY Jesse F. Keville
Wood, Arey, Herron & Evans
ATTORNEYS

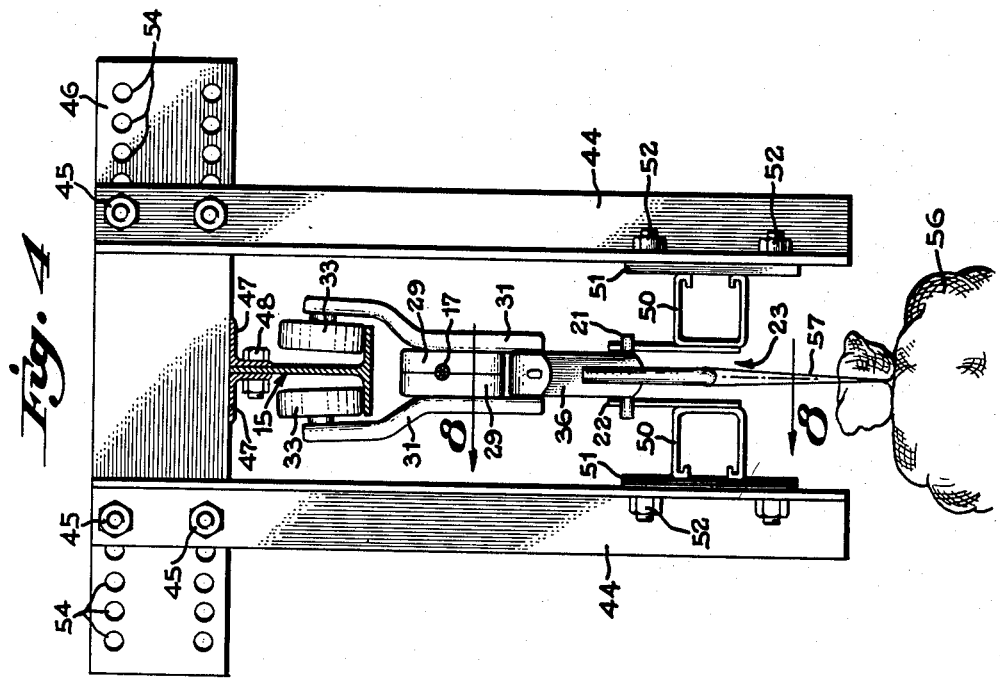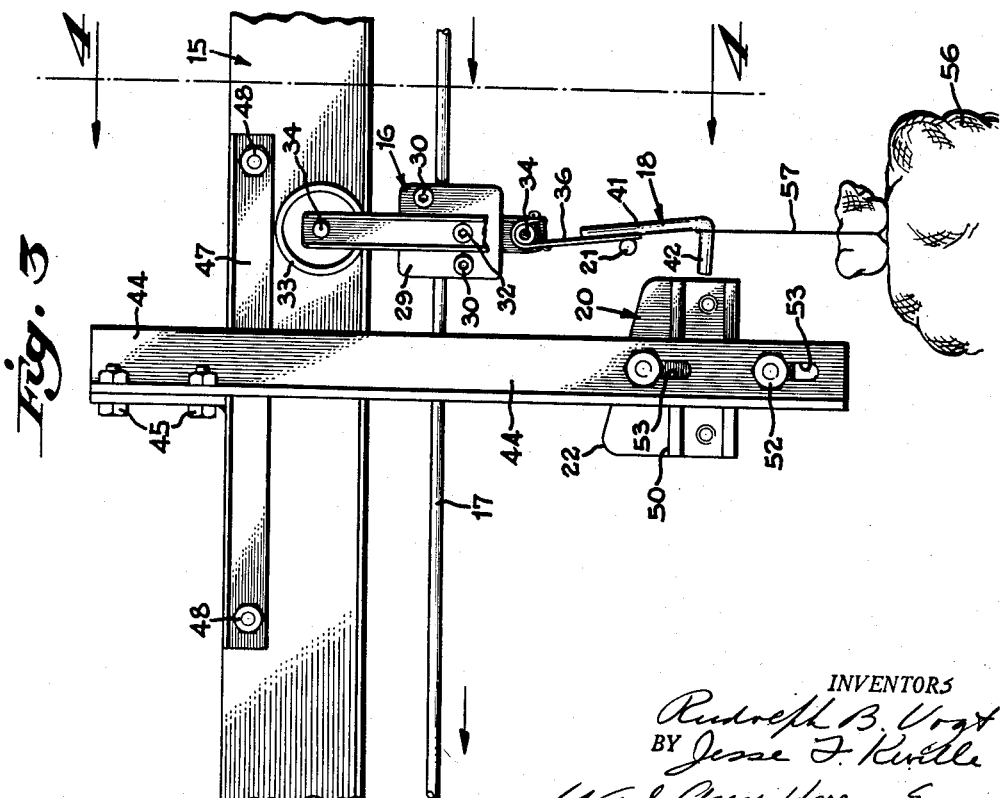

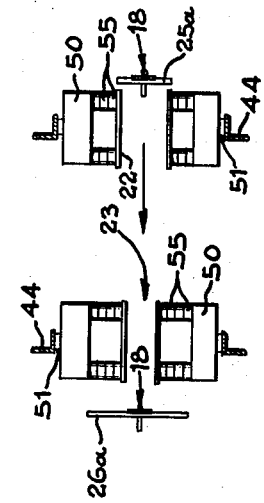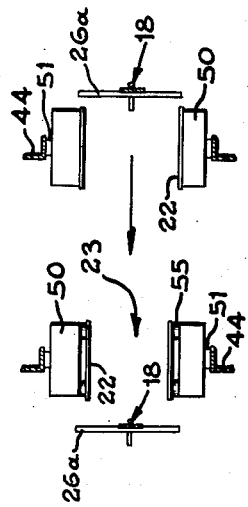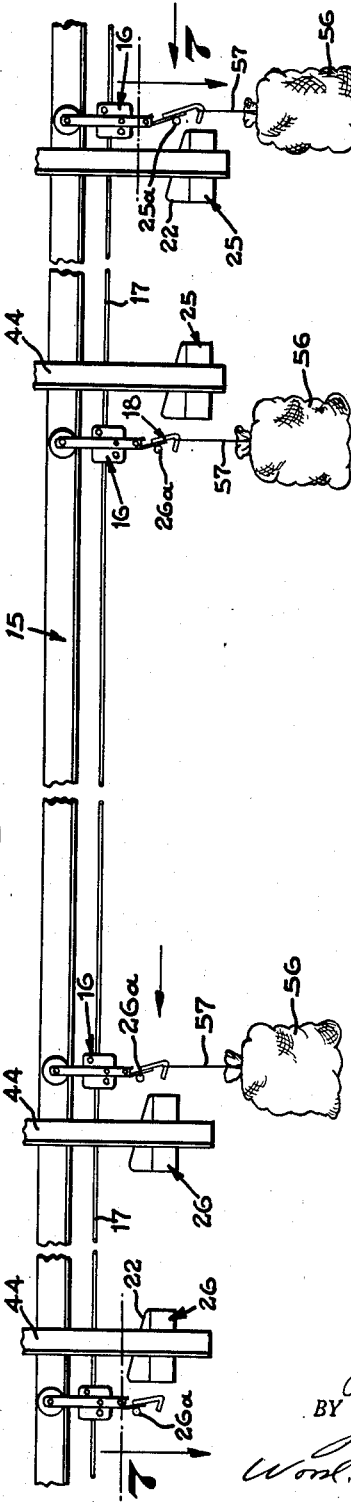

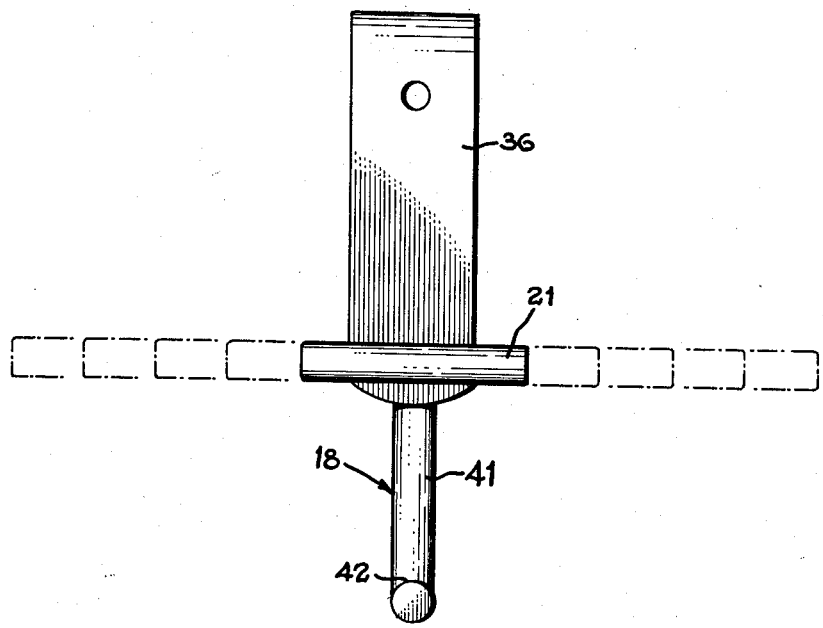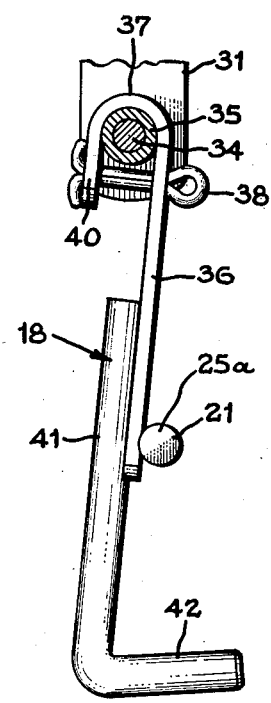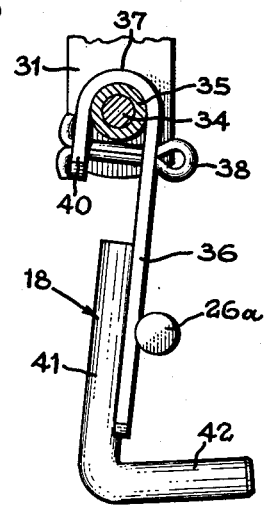

Patented Dec. 8, 1953

2,661,828

UNITED STATES PATENT OFFICE 2,661,828

CONVEYER SYSTEM

Rudolph B. Vogt, Cincinnati, Ohio, and Jesse F. Keville, Pomona, Calif., assignors to The E. W. Buschman Company, Cincinnati, Ohio, a corporation of Ohio Application February 13, 1948, Serial No. 8,144

2 Claims. (Cl. 198—38)

This invention relates to conveyor systems of the overhead suspension type which are extensively used in industry to convey work pieces during fabrication, assembly, or treatment, and in dispatching and transporting merchandise generally. More particularly, the invention resides in an improved selective discharge apparatus for rendering the conveyor capable of discharging the articles selectively at designated stations, in a continuous automatic manner.

Otherwise expressed, the improved system comprises a conveyor having a series of hooks or supports of various colors indicative of the types or sizes of articles which such hooks or supports are to receive, and selective tripping means for causing the discharge at one point of the articles from all those hooks of one given color, the discharge at the point of the articles from all those hooks of another given color, etc., such that, articles sorted as to size or grade will be delivered from the conveyor at each tripping station.

The invention is exemplified in relation to conveying and sorting of graded fruit packed in bags since it has been found particularly useful in this industry, but it may be utilized with equal facility for other purposes. As applied to fruit handling, the conveyor is provided with a series of hangers or hooks adapted to receive the drawstring or loop of a bag, and the colors of the hooks designate the grades, or sizes of fruit packed in the bags. The system is arranged to pass along and serve one or several loading stations at which the fruit is graded, bagged and hooked upon the conveyor, and all hooks of a given color are constructed to be tripped at one discharge station while the other hooks may pass on to other discharge stations at which all hooks of other given colors discriminately will be tripped. Thus, during its travel along the conveyor system towards its discharge end, the bag for such hooks automatically passes those discharge stations which are designated for unlike classes of merchandise, and upon reaching the station for which it is destined, the hook encounters a tripping device which causes it to swing to an angular position and drop the bag by gravity at the station. All merchandise of given class or grade is delivered to, or collected at prescribed stations, so long as the operators merely use ordinary care in loading the proper articles onto the hooks in conformity with the color thereof.

In fruit handling, the conveyor system may extend through a warehouse and along a loading dock and the discharge stations may be arranged to drop the graded bags directly into crates, cars or trucks at the dock for shipment. The conveyor thus performs directly both the conveying and loading functions and renders more efficient and speedy the grading, dispatching and shipment of the fruit. The system is of particular advantage in this and similar fields because the perishable nature of the merchandise places a premium upon speedy distribution and shipment after picking.

Ordinarily, in the handling of bagged fruit, the bags repeatedly are dropped to or from trucks, conveyors, hand trucks or the like. This causes the fruit to become bruised and dented and induces rapid spoilage, often before the product reaches the markets. By the improved system most of this rough handling is eliminated, the bags being directly conveyed from loading to unloading stations, safely suspended from hooks. The fruit thus reaches the market unbruised and in good condition so that spoilage losses are greatly reduced.

The selective discharge apparatus is exemplified in conjunction with an overhead trolley conveyor of standardized construction, although it may be applied to systems other than the overhead type. Thus, for moving of bulk materials the hooks may be interchanged with trays or pans arranged to be tripped at selected stations.

As incorporated into trolley type overhead conveyor, the system embodies the usual T-rail support for the trolleys and a driven chain or cable to which the series of trolleys are connected for translation along the track. Hooks are pivotally connected to the trolleys and each hook includes a trip bar extending laterally from opposite sides, adapted to be engaged selectively as it passes relative to a series of stationary tripping skids installed at the desired discharge points. These skids are keyed, each to a designated trip bar, so as to trip and unload the hooks selectively as they pass through the station. It has been a primary object of the inventors to provide a simple and positive system of tripping devices correlated with differential tripping bars of such construction that the devices may readily be installed upon standard conveyor systems without substantial change so as to render the system automatic and thereby eliminate the tedious and expensive problem of loading or unloading merchandise manually.

Although the apparatus is designated primarily for selective unloading, the same apparatus may be utilized also for loading the merchandise, the bags being graded and placed in position at designated loading stations and picked up automatically. The tripping devices are arranged so that only hooks of a designated class are lowered at each station in position to encounter the loop or drawstring of a bag at that station, while hooks designated for other classes assume an elevated angular position at this particular station. In this function the operation is substantially the same as for unloading except that the hook engages instead of disengaging the bag at the pick-up station. Discharge stations, corresponding to the pick-up stations, serve to unload the conveyor at required points. The apparatus therefore, is adapted to provide a convenient and automatic system either to convey and discharge automatically the merchandise at a selected group of stations, or to pick-up automatically at loading stations and discharge automatically at selective unloading stations.

In the drawings:

Figure 3 is an enlarged fragmentary side elevation detailing the tripping or unloading station relative to a portion of the conveyor, with a trolley unit shown approaching the tripping or unloading station.

Figure 4 is a sectional view taken on line 4—4, Figure 3, further illustrating the structural details of the conveyor and tripping mechanism.

Figure 6 is a fragmentary side elevation similar to Figure 1 illustrating a somewhat modified structural arrangement for the tripping stations.

Figure 7 is a sectional view taken on line 7—7 further illustrating the tripping stations as projected from Figure 6.

Figure 8 is a sectional view taken on line 8—8, Figure 4, detailing the mounting of the hook relative to a trolley hanger.

Figure 9 is a face view illustrating the hook assembly of Figure 8 removed from the hanger and illustrating in broken lines, a series of trip bar lengths for engagement with a series of differentially spaced unloading skids.

Figure 10 is a side elevation partially in section, similar to Figure 8, illustrating modified hook structure which is applied to the modified system illustrated in Figures 6 and 7.

In the preferred embodiment of the apparatus which is capable of performing functions of the type described, a conveyor I-beam or track is indicated generally at 15, having a trolley assembly 16 tracked thereon, translated by means of the driven cable 17. Suspended from the lower end of the trolley assembly is a carrier hook unit generally indicated at 18, adapted to cooperate with a trip device 20.

Figure 2:
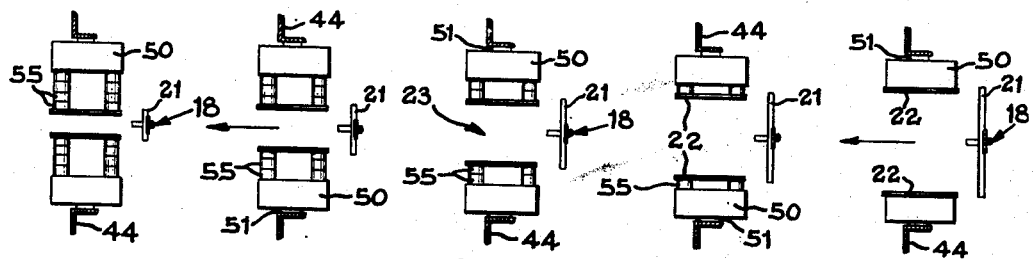
Figure 2 is a sectional view taken on line 2—2, Figure 1, illustrating a series of tripping stations as projected from Figure 1 with a corresponding tripping bar and hook positioned relative to each.
Figure 1:
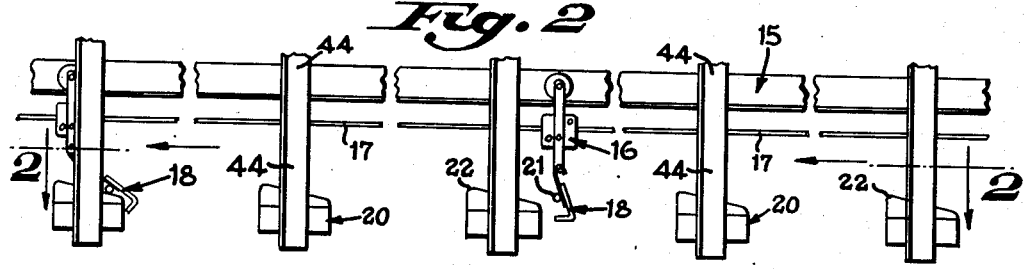
Figure 1 is a general fragmentary side elevation illustrating a section of a conveyor system embodying the selective unloading devices.

As illustrated diagrammatically in Figures 1 and 2, the track 15, following the usual mode of installation, is in the form of an endless loop which extends throughout the plant or warehouse, so as to reach into and serve the necessary points throughout the installation. The track 15 is supported in any well known manner, usually being suspended from the ceiling so as to convey the articles at a convenient elevation above the floor level. Although generally horizontal, the conveyor tracking beam may include inclined sections to bring the hooks at required levels at loading and unloading stations. For instance, it may cause them to rise after being loaded, and to travel in an elevated plane and to descend at the unloading stations. The track also may be arranged to accommodate various floor levels in the building to accommodate the particular product or process to which the system is applied.

Figure 5:
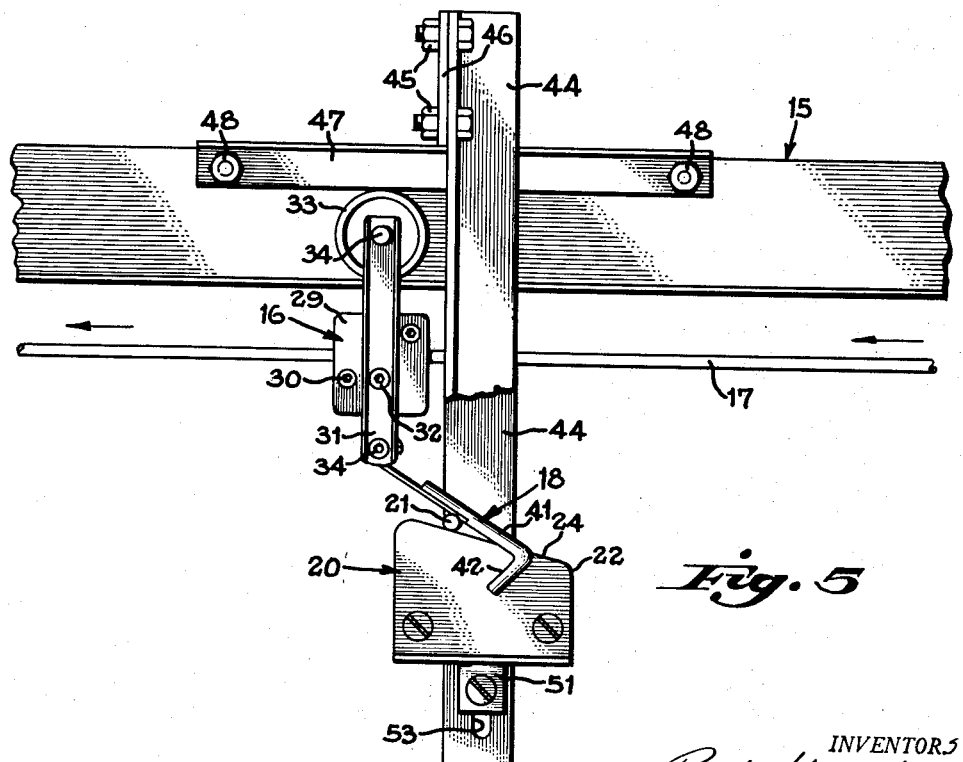
Figure 5 is a side view similar to Figure 3, showing the operation of the tripping skid with respect to one of the conveyor hooks for unloading the hook.

As illustrated in Figures 1 and 2, the trip or unloading stations 20 may be located at any desired point or points along the conveyor system being illustrated closely adjacent each other merely for the purpose of disclosure. Briefly describing the operation of the system, it will be noted in Figure 2, that the several conveyor trolleys 16 are provided with cross bars 21 of variable length and that the respective unloading stations include spaced skid plates or cams 22—22 adapted to engage selectively the opposite ends of the bars 21. Engagement with the skids causes the hook 18 to be tripped as shown in Figure 5, thereby to discharge the article suspended from the hook. In order to provide for selective discharge, it will be noted that the spacing between skid plates 20—20, indicated at 23, varies in accordance with the length of the various trip bars 21. In the system as disclosed in Figures 1 and 2, a series of five unloading stations is provided and consequently a series of five bar lengths, one for each station, is required. The unloading stations are arranged in the order shown in Figure 2 although in practice the stations are located to suit the requirements of each particular job. The trolley units 16 likewise are spaced according to the particular installation and are arranged in the order shown, the leading unit having the shortest bar, and the following units having successively longer bars in increments as shown in Figure 9. This grouping and arrangement is maintained throughout the conveyor system, the arrangement being duplicated for as many hook groups as the length of the conveyor system requires. It will be apparent from Figure 2 therefore, that the bar 21 of the leading trolley unit is free to pass uninterruptedly from right to left between the four decreasing spaces 23, until the fifth or left hand station is reached. Upon encountering this station, the opposite ends of bar 21 engage upon the inclined upper edge 24 of skid plates 22—22, causing the hook 18 to swing rearwardly to discharge its merchandise.

In the modified structure illustrated in Figures 6 and 7, the same system of unloading stations and variable length trip bars 21 is employed, but additional duplicate groups of stations are added by providing two sets of unloading stations at different elevations, and by providing two sets of hooks having trip bars at two elevations as detailed in Figures 8 and 10. In the structure illustrated in Figures 6 and 7, it will be noted that the tripping stations 25 to the right are arranged at a lower elevation than those illustrated at 26 on the left of the view. It will further be noted that the conveyor trolley units are provided with tripping bars disposed at two elevations, those indicated at 25a being arranged to be tripped at stations 25 and those indicated at 26a being arranged to trip at stations 26. The respective stations 25 and 26 have their skid plates arranged in successively decreasing spacing 23 in the same manner as previously noted with reference to Figure 2. There likewise is provided a corresponding series of hooks having trip bars of correlated length, one for each station, arranged sequentially with the leading unit arranged to pass between stations having decreasing spaces, whereby the short trip bar passes all but the last station. As shown, it will be apparent that the trip bars 26a for the trip stations 26 are located at an elevation sufficient to clear the upper edge of the skids at stations 25. Therefore, all of the trolley units for station 26 will pass station 25 without unloading but that they will be unloaded selectively upon reaching stations 26. In other words, the trolley units are arranged into groups, each group having trip bars of gradually increasing length and each group of bars being disposed at a different level, therefore the group 26a clears stations 25 and are later tripped upon reaching stations 26. By this arrangement the capacity may be multiplied, it being feasible to apply as many flights or elevations as the installation requires.

Described in detail with reference to Figures 3 and 4, the preferred trolley unit construction embodies a pair of blocks 29—29 disposed on opposite sides and in clamping engagement with cable 17 by means of screws 30—30. A pair of hangers 31 is secured on opposite sides of blocks 29 by screws 32 and the upper ends of the hangers are provided with rollers 33—33 on opposite sides of track 15, journalled upon stub shafts 34—34 secured to the respective hangers. Rollers 33 if desired may be provided with antifriction ball or roller bearings following the prevailing practice. The lower ends of the hangers 31 extend below the blocks 29 and a cross shaft 34 extends between the spaced lower limbs on hanger members as shown in Figures 3 and 10. A sleeve 35 preferably is journalled upon the shaft 34 to maintain hangers properly in spaced relation and upon the sleeve 35 is suspended a hanger strap 36 having its upper end bent to form a loop 37 resting upon sleeve 35. A cotter pin 38 is placed through the strap and lower end 40 of the loop to lock the strap permanently in position upon the sleeve. Upon the lower shank portion of strap 36 is welded or otherwise secured, the shank 41 of hook 18 and the lower end of the hook member is bent substantially at right angles to the shank 41 as at 42 providing a cantilever extension adapted to receive the loop or strap of the merchandise bags as shown in Figures 3 and 4.

As shown in Figures 8 and 9, the trip bar 21 is welded or otherwise secured to lower end of strap 36 with its opposite ends projecting beyond the side edges of the strap. It will be noted that the strap is free to pass between the plates of the narrowest unloading station without interference and that the trip rod 21 extends laterally in successive increments for the several unloading stations as indicated by broken lines in Figure 9. It is to be noted at this point that the conveyor system and hangers may be of standard construction and the system converted by removing from the hangers the standard hooks and replacing them with the trip rod hook units 18 in a simple manner.

Referring to Figures 3 and 4 detailing the unloading stations for the single flight system, the skid plates 20—20 are mounted in position by means of a pair of spaced angle irons 44—44 having their upper ends secured by bolts 45 to a cross plate 46 mounted upon the top of tracking beam 15. Plate 46 is secured by means of a pair of angle irons 47—47 secured by means of bolts 48 to the upper edge of beam 15. Cross plate 46 rests upon the upper webs of angle irons 47 and is preferably secured thereto by welding.

The skid plates 20—20 are mounted relative to the lower ends of angle irons 44 by means of channel irons 50—50 preferably welded to mounting plates 51—51 which in turn are secured to the vertical angle irons by means of studs 52—52 welded or otherwise secured to the plates 51—51. Studs 52 project through slots 53—53 formed in the web of angle irons 44—44. It will be noted therefore that the elevation of the trip stations may be adjusted in the range provided by the length of the slots 53 so as to permit the stations to be adjusted to variable elevations as previously described. It also will be noted that the cross plate 46 is provided with a series of five holes 54, in paired relationship on opposite ends of the plate. These holes permit the spacing of skid plates 20 to be varied to provide the successive decreasing spacing 23, previously noted. In the adjustment shown in Figure 4 the plates are shown at their minimum width spacing for tripping the shortest trip rod 21 of the series. The structure illustrated in Figure 4 therefore is adjustable both as to width and elevation so as to provide two groups at different elevations each providing five trip stations, as indicated in Figures 6 and 7. It will be apparent that the scope of adjustment may be increased by increasing the number of holes 54 and trip bar lengths 21 as required, and also that more than two elevations may be provided by increasing the length of slots 53 and providing corresponding groups of hook equipment with trip rods 21 at appropriate elevations.

A modified arrangement for providing the variable spacing between the plates 22—22 is illustrated in Figure 7. In this arrangement the vertical angle members 44—44 are arranged at fixed spacing at a maximum distance apart. The channel members 50 may be secured to the angles by means of base plates 51 as described with reference to Figure 4. In the present instance, however, the spacing 23 between the plates is varied by the application of washers or spacers 55 between the channels and plates. In this arrangement therefore the maximum spacing is obtained by bolting the plates 22 directly to the channels 50 as shown to the right of Figure 7 and the decreased spacing is obtained by adding a successively greater number of washers, one washer thickness for each plate at the successive stations.

As applied to the packing of oranges or a similar product to exemplify a preferred mode of operation, the several hooks of each series is painted a distinctive color. The oranges are packed in bags indicated at 56 each bag having a drawstring 57 which is utilized to close the bag and to provide a loop for engagement by the conveyor hooks 42. The oranges are packed into these bags by packers who grade the product according to size or quality and after filling the bag the packer hangs it by its drawstring on the designated hook or discharger. In the present example, the dischargers are constructed so that five grades or sizes of fruit can be packed at the same time and each is discharged in its correct size or grade pile when the conveyor carries the discharger through the trip station. Beneath each trip station may be provided a chute down which the bags slide to be packed in crates or directly into refrigeration cars or trucks. It has been found that the improved system not only improves the efficiency and speed of the packing operation, but also reduces greatly the amount of handling, whereby the fruit reaches the market with a minimum of bruising and in better condition.

The apparatus may be arranged for automatic selective loading by providing loading skid stations 20 but in this case preferably the order is reversed with the narrowest spacing in the lead so that the shortest trip bar may pick up a bag and pass without tripping through successively wider spaced plates. Also the bags should be placed in successive order at the successive stations so that there is no interference with bags being conveyed through these stations from preceding stations. For use in loading, the drawstring or loop 57 should be of sufficient stiffness to hold its shape for hook engagement.

Having described our invention, we claim:

1. A selective conveyor system adapted to suspend and transport a series of loaded bags or the like having suspension means and adapted to discharge the loaded bags at a plurality of pre-selected discharge stations, said conveyor system comprising a conveyor rail, a plurality of trolleys, a conveyor cable connected in common to the trolleys and adapted to advance the same along the rail, each of said trolleys having a pair of vertical hangers secured along opposite sides thereof, said hangers having upper ends straddling said rail and having lower ends extending below the trolley, respective rollers journalled upon the upper ends of said hangers and tracked upon the opposite sides of the rail, whereby the trolleys are suspended from the rail, a carrier strap having an upper end interposed between and pivotally connected to the lower ends of said hangers upon an axis disposed at right angles to the cable, each of said straps having a cantilever extension at its lower end extended generally on a horizontal axis forwardly in the direction of conveyor advancement and adapted to engage the suspension means of the bag during transport, a respective trip bar secured to each of said carrier straps in a plane intermediate its pivotally mounted upper end and said cantilever extension, each of said trip bars extending transversely from the opposite sides of the strap and at right angles to the direction of advancement, the trip bars being of successively increasing length from the leading toward the trailing trip bars as determined by the direction of conveyor advancement, a series of stationary skid members mounted in spaced pairs along said conveyor rail, each pair of skid members being spaced apart transversely to the direction of conveyor advancement, said spaced skid members being of substantial length and having parallel upper edges inclined upwardly in the direction of conveyor advancement, said edges being disposed in the path of advancement of the trip bars and being arranged in successively decreased spacing in the direction of advancement and related to the increasing length of the trip bars to provide selective discharge stations, said edges being adapted to provide clearance for the passage therebetween of trip bars which are shorter than said spacing and adapted to intercept the opposite ends of related trip bars which are greater in length than said spacing, said inclined upper edges being adapted to cam the related trip bar upwardly and to partially sustain the weight load of the suspended bag with the carrier strap stabilized laterally during advancement of the trip bar along said inclined edges, whereby the advancement of the trolley by said cable is effective to swing said carrier strap progressively to an angular position causing the suspension means of the bag to slide from said cantilever extension at the discharge station.

2. A selective conveyor system adapted to suspend and transport a series of loaded bags or the like having suspension means and adapted to discharge the loaded bags at a plurality of pre-selected discharge stations, said conveyor system comprising a conveyor rail, a plurality of trolleys, a conveyor cable connected in common to the trolleys and adapted to advance the same along the rail, each of said trolleys having a pair of vertical hangers secured along opposite sides thereof, said hangers having upper ends straddling said rail and having lower ends extending below the trolley, respective rollers journalled upon the upper ends of said hangers and tracked upon the opposite sides of the rail, whereby the trolleys are suspended from the rail, a carrier strap having an upper end interposed between and pivotally connected to the lower ends of said hangers upon an axis disposed at right angles to the cable, each of said straps having a cantilever extension at its lower end extended generally on a horizontal axis forwardly in the direction of conveyor advancement and adapted to engage the suspension means of the bag during transport, a respective trip bar secured to each of said carrier straps in a plane intermediate its pivotally mounted upper end and said cantilever extension, each of said trip bars extending transversely from the opposite sides of the strap and at right angles to the direction of advancement, the trip bars being of successively increasing length from the leading toward the trailing trip bars as determined by the direction of conveyor advancement, a series of stationary skid members mounted in spaced pairs along said conveyor rail, stationary support means for mounting said skid members, a plurality of spacers interposed between the support means and the skid members to vary the spacing therebetween, the said spacers being substantially equal in length to the length increases of the respective trip bars, whereby the spacing of said paired skid members is correlated to the respective trip bars by the number of spacers interposed between the support means and respective skid members, said spaced skid members being of substantial length and having parallel upper edges inclined upwardly in the direction of conveyor advancement, said edges being disposed in the path of advancement of the trip bars and being arranged in successively decreased spacing in the direction of advancement and related to the increasing length of the trip bars to provide selective discharge stations, said edges being adapted to provide clearance of the passage therebetween of trip bars which are shorter than said spacing and adapted to intercept the opposite ends of related trip bars which are greater in length than said spacing, said inclined upper edges being adapted to cam the related trip bar upwardly and to partially sustain the weight load of the suspended bag with the carrier strap stabilized laterally during advancement of the trip bar along said inclined edges, whereby the advancement of the trolley by said cable is effective to swing said carrier strap progressively to an angular position causing the suspension means of the bag to slide from said cantilever extension at the discharge station.

RUDOLPH B. VOGT.
JESSE F. KEVILLE.

References Cited in the file of this patent

UNITED STATES PATENTS

| Number | Name | Date |
|---|---|---|
| 684,776 | Barnes | Oct. 22, 1901 |
| 1,271,303 | Flowers | July 2, 1918 |
| 1,331,622 | Carstarphen | Feb. 24, 1920 |
| 1,826,412 | Bennett | Oct. 6, 1931 |
| 1,875,966 | Webb et al. | Sept. 6, 1932 |
| 1,907,894 | Stevens et al. | May 9, 1933 |
| 1,992,686 | Anderson | Feb. 26, 1935 |

FOREIGN PATENTS

| Number | Country | Date |
|---|---|---|
| 248,168 | Italy | Apr. 7, 1926 |